United States Patent Office 3,640,891
Patented Feb. 8, 1972

3,640,891
LITHIA-SILICA GLASS LASER CONTAINING
VARIOUS ALKALINE EARTH OXIDES
Haynes A. Lee, Jr., Sylvania, and Charles F. Rapp,
Toledo, Ohio, assignors to Owens-Illinois, Inc.
No Drawing. Continuation-in-part of application Ser. No.
595,000, Nov. 17, 1966. This application June 6, 1969,
Ser. No. 831,257
The portion of the term of the patent subsequent to
Oct. 7, 1986, has been disclaimed
Int. Cl. C09k 1/54; H01s 3/16
U.S. Cl. 252—301.4                               21 Claims

ABSTRACT OF THE DISCLOSURE

Glass laser compositions based on the lithia-silica glass system containing as selected alkaline earths MgO, BeO, SrO, BaO, mixtures thereof, and mixtures containing CaO. These glasses are employed as hosts for neodymium oxide, $Nd_2O_3$, as the laseable substance. Good efficiencies can be obtained thereby.

This application is a continuation-in-part of application Ser. No. 595,000, filed November 17, 1966, now U.S. Pat. 3,471,409.

The present invention relates to glass lasers for high energy applications and, more particularly, to glass laser compositions of the lithia-silica system that include substantial amounts of selected alkaline earth compounds and mixtures thereof. Relatively high efficiency and low solarization in high power pulsed applications are obtainable thereby.

In the field of the high power pulsed lasers, it is highly desirable that the laser material be efficient from the standpoint of power output compared to power input. In addition, laser rods should resist discoloration or solarization. Prior glass laser compositions have had a number of drawbacks in this connection.

Therefore, it is an object of the present invention to provide a glass laser composition having relatively high efficiency in high energy applications.

It is an object of the present invention to provide a glass laser composition having relatively high efficiency in a high power pulsed laser and low solarization.

It is a further object of the present invention to provide glass laser compositions in the lithia-silica system having relatively high efficiency, and having a combination of desirable properties such as proper thermal expansion, and internal mechanisms for converting pump light to thermal energy.

It is still a further object of the present invention to provide a glass laser composition and a method of making the same, the glass laser having high efficiency, low solarization, and a desirable low light energy-thermal energy conversion characteristic.

In attaining the above and other objects, one feature of the present invention resides in glass laser compositions of the lithia-silica system containing substantial amounts of selected alkaline earth compounds, the composition, expressed on an oxide basis, comprising about 45 to 75 mole percent silica, about 15 to 35 mole percent lithia, about ½ to 30 mole percent alkaline earth oxide selected from the group consisting of MgO, BeO, SrO, BaO, and mixtures thereof, and mixtures of one or more of the aforementioned with CaO, about 0.1 to 2 mole percent neodymium oxide, and optionally, about 1/10 to ½ mole percent cerium oxide. The total amount of lithia plus RO (MgO, BeO, etc.) is not substantially higher than about 50 mole percent.

These and other objects, features and advantages of the present invention will become apparent from the specification that follows and the appended claims.

The present invention provides an improved glass laser composition of the lithia-silica system containing substantial amounts of a selected alkaline earth compound and being doped with neodymium oxide, the glass laser being improved in efficiency in high energy applications.

In general, glass laser compositions of the present invention as described above contain the following ingredients in ranges expressed in approximate mole percent and weight percent corresponding very roughly to said mole percent, the ingredients being set forth based on the oxides:

| Ingredients | Mole percent | Weight percent |
|---|---|---|
| $SiO_2$ | 45 to 75 | 50 to 80. |
| $Al_2O_3$ | 0 to 8 | 0 to 15. |
| $Li_2O$ | 15 to 35 | 8 to 20. |
| RO | ½ to 30 | ½ to 30. |
| $Nd_2O_3$ | 1/10 to 2 | ½ to 8. | wherein RO represents a member selected from MgO (magnesium oxide), BeO (beryllium oxide), SrO (strontium oxide), and BaO (barium oxide, or mixtures thereof, or mixtures of one or more of these with CaO (calcium oxide).

The present invention is directed to a high efficiency neodymium oxide-doped glass laser host material of the lithiasilica system containing substantial amounts, i.e., at least ½ up to 30 mole percent, of the above selected alkaline earth oxides. It is to be understood that the term "alkaline earth oxide" when used herein also encompasses mixtures of alkaline earth oxides. While applicants do not wish to be bound by any other theory, the improved performance of lithia-silica glasses may result from the small size of the lithium ion and its place in the glass structure. The lithium ion is small enough to be six-fold coordinated in the structure and each oxygen atom can contribute a greater proportion of its energy to its bond with lithium than can an oxygen atom that is part of an eight-fold coordination. This will polarize the oxygen ion to a greater extent which will then give a greater polarization to the neodymium ion.

As previously indicated, as low an amount of the added alkaline earth oxide as about ½ mole percent provides some improvement in the property of the glass to convert input energy to output energy, the resultant glass laser having high efficiency and yet little solarization. Generally, the added alkaline earth oxide can be used in an amount up to about 29 or 30 mole percent and still obtain a good glass laser material, providing that the total amount of the selected alkaline earth oxide or mixture thereof and lithia does not exceed about 50 mole percent. When mixtures of CaO and one or more other alkaline earth oxides are used, the mixtures preferably contain at least about 0.1 mole percent of the other alkaline earth oxides.

The preferred and optimum glass laser compositions are set forth below, each ingredient being listed in its approximate mole percent.

| Ingredient | Preferred | Optimum |
|---|---|---|
| $SiO_2$ | 48 to 65 | 49 to 62. |
| $Al_2O_3$ | 0 to 8 | 2 to 5. |
| $Li_2O$ | 20 to 30 | 25 to 30. |
| RO | 5 to 25 | 8 to 22. |
| $Nd_2O_3$ | 0.1 to 2 | 0.1 to 1. |
| $CeO_2$ | 0.1 to 0.3 | 0.1 to 0.2. | wherein RO has the same meaning as previously given.

As to the amount of silica present in the compositions, when the lower limit of silica is below about 45 mole percent, the composition tends to be somewhat unstable in that it is more difficult to handle and is more likely to devitrify. When the amount of silica is about 75 mole percent or more, the lasing efficiency drops off, particularly when the lithia is at its minimum.

Where the selected alkaline earth oxide is at its minimum or near-minimum level, generally about 24 mole percent of lithia is needed. When the lithia content is near its minimum of 15 mole percent, at least about 10 mole percent of selected alkaline earth oxide is needed to provide a substantial improvement in lasing efficiency.

Optionally, up to 8 mole percent of alumina can be used, it generally being preferred that, when used, at least about 2 mole percent be employed to help provide the unusual combination of properties of the laser glass including chemical durability, high efficiency and low solarization.

As previously indicated, generally neodymium oxide is used in amounts of about 0.1 mole percent to as high as about 2 mole percent or more, with the preferred range being from about 0.1 to 1 mole percent. Generally, it is highly preferred to have at least 0.1 mole percent $Nd_2O_3$ in the composition, the optimum amount being usually from about 0.1 to 0.8 or 1.0 mole percent.

Generally, the amount of the solarization-inhibiting oxide, that is preferably $CeO_2$, employed is about 1/10 to 1/2 or more mole percent. The use of at least about 1/10 mole percent $CeO_2$ helps materially to inhibit solarization which darkens the rod and results in a substantial loss in efficiency. Preferably, the amounts of $CeO_2$ are kept relatively low so that other desirable properties of the glass laser will not be affected. In some cases, other inhibiting oxides such as antimony and titania can be substituted for all or part of the $CeO_2$, but preferably at least 50 mole percent of the inhibiting oxides present is $CeO_2$. It is understood that the cerium oxide present in the glasses is reported as $CeO_2$ but that the oxide is usually present both as $CeO_2$ and $Ce_2O_3$ with the $Ce_2O_3$ probably being the major portion.

The following examples are intended to illustrate the present invention.

EXAMPLE 1

A melt was prepared by mixing reagent grade raw materials to form a glass melt of high optical quality having the following composition:

| Ingredient | Mole percent | Weight percent |
|---|---|---|
| $SiO_2$ | 60 | 68.27 |
| $Al_2O_3$ | 2.5 | 4.83 |
| $Li_2O$ | 27.5 | 15.56 |
| MgO | 10 | 7.64 |
| $Nd_2O_3$ | 0.5 | 3.19 |
| $CeO_2$ | 0.16 | 0.52 |

The foregoing composition was obtained by melting at 2500° F. the following batch ingredients:

| | Gm. |
|---|---|
| $SiO_2$ | 2048.10 |
| $Al_2O_3$ | 144.90 |
| $Li_2CO_3$ | 1162.35 |
| $MgCO_3$ | 541.59 |
| $Nd_2O_3$ | 95.70 |
| $CeO_2$ | 15.60 |

The silica employed was a crystalline quartz sold commercially as Amersil A 98. Calcined Baker-analyzed reagent $Al(OH)_3$ was the source of $Al_2O_3$. Both the lithium and magnesium carbonates were Baker-analyzed reagents. The neodymium oxide was Lindsay Code 629.9, and the cerium oxide was Lindsay Code 217.

Following formation of the melt, the glass was annealed at 950° F. for 3 hours.

Rods of about 1/2 inch diameter and 4 inches in length were then formed from the glass and the ends of the rods were polished to a close tolerance.

The rod was placed in a cylindrical cavity with a highly polished aluminum interior surface. A PEK XE5-2153-2 helical xenon flashlamp (PEK Laboratory, Sunnyvale, Calif.) was used. The energy to the lamp was supplied from power supply containing capacitors that are chargeable to produce a constant capacitance, the power supply being a Lear Siegler, Inc., Energy Storage Unit and Control Power Unit. In this test the capacitance was constant at 200 microfarads, and the voltage varied from about 2.5 to 4.0 kv. High efficiencies were obtained.

The rod did not change color or otherwise degrade by exposure to the intense light of the xenon flashlamp pumping unit even after many pulses.

EXAMPLE 2

A melt was prepared in a manner described in Example 1 to form a glass melt having the following approximate composition:

| Ingredient: | Mole percent |
|---|---|
| $SiO_2$ | 59.16 |
| $Al_2O_3$ | 3.34 |
| $Li_2O$ | 27.5 |
| BeO | 10 |
| $Nd_2O_3$ | 0.5 |
| $CeO_2$ | 0.16 |

Rods were prepared from the melt and tested for efficiency in a high power pulsed test system as described in Example 1. The laser rods showed improved efficiency.

The rods also did not solarize when exposed to the intense light of the pumping flashlamp.

EXAMPLE 3

A melt was prepared and rods made therefrom as described in Example 1, the melt having the following approximate composition:

| Ingredient: | Mole percent |
|---|---|
| $SiO_2$ | 60 |
| $Al_2O_3$ | 2.5 |
| $Li_2O$ | 27.5 |
| SrO | 10 |
| $Nd_2O_3$ | 0.5 |
| $CeO_2$ | 0.16 |

The rods were tested as described in Example 1 and exhibited relatively high efficiency and had little tendency to solarize.

EXAMPLE 4

A melt was prepared and rods were made therefrom as described in Example 1, the melt having the following composition:

| Ingredient: | Mole percent |
|---|---|
| $SiO_2$ | 60 |
| $Al_2O_3$ | 2.5 |
| $Li_2O$ | 27.5 |
| BaO | 10 |
| $Nd_2O$ | 0.5 |
| $CeO_2$ | 0.16 |

The rods were tested as described in Example 1 and found to exhibit good efficiency and reduced tendency to solarize.

EXAMPLE 5

A melt was prepared and rods were made therefrom as described in Example 1, the melt having the following composition:

| Ingredient: | Mole percent |
|---|---|
| $SiO_2$ | 50 |
| $Al_2O_3$ | 2.5 |
| $Li_2O$ | 27.5 |
| BaO | 20 |
| $Nd_2O_3$ | 0.5 |
| $CeO_2$ | 0.16 |

The rods were tested as described in Example 1 and found to exhibit good efficiency and reduced tendency to solarize.

EXAMPLE 6

The following composition was employed to form a glass laser rod:

| Ingredient: | Mole percent |
|---|---|
| $SiO_2$ | 60 |
| $Al_2O_3$ | 2.5 |
| $Li_2O$ | 27.5 |
| MgO | 3 |
| CaO | 3 |
| SrO | 2 |
| BaO | 2 |
| $Nd_2O_3$ | 0.5 |
| $CeO_2$ | 0.16 |

The rod was tested and performed satisfactorily.

What is claimed is:

1. A glass laser comprising the following ingredients in mole percentages:

| Ingredient: | Percent |
|---|---|
| $SiO_2$ | 45 to 75 |
| $Li_2O$ | 15 to 35 |
| RO | ½ to 30 |
| $Nd_2O_3$ | 1/10 to 2 |
| $Al_2O_3$ | 0 to 8 | wherein RO is selected from the alkaline earth oxide group consisting of MgO, BeO, SrO, BaO, mixtures thereof, and mixtures of one or more of the foregoing with CaO, where the total amount of $Li_2O$ and RO is not substantially higher than about 50 mole percent; when the $Li_2O$ is present at about 15 mole percent, the amount of RO is at least about 10 mole percent; and when the RO content is at least about ½ mole percent, the amount of $Li_2O$ is at least about 24 mole percent, and when mixtures of CaO and another alkaline earth oxide are employed, said another alkaline earth oxide being present in an amount of at least about 0.1 mole percent.

2. A glass laser as defined in claim 1 wherein $Al_2O_3$ is present in an amount of at least 2 mole percent.

3. A glass laser as defined in claim 1 in which the following ingredients are present in mole percent:

| Ingredients: | Percent |
|---|---|
| $SiO_2$ | 48–65 |
| $Li_2O$ | 20–30 |
| RO | 5–25 |
| $Nd_2O_3$ | 0.1–2 |
| $Al_2O_3$ | 0–8 | wherein RO is defined as in claim 1.

4. A glass laser as defined in claim 1 in which the following ingredients are present in mole percent:

| Ingredient: | Percent |
|---|---|
| $SiO_2$ | 49–62 |
| $Li_2O$ | 25–30 |
| RO | 8–22 |
| $Nd_2O_3$ | 0.1–1 |
| $Al_2O_3$ | 2–5 | wherein RO is defined as in claim 1.

5. A composition as defined in claim 1 containing a small but effective amount of $CeO_2$.

6. A glass laser as defined in claim 5 in which the following ingredients are present in mole percent:

| Ingredient: | Percent |
|---|---|
| $SiO_2$ | 48–65 |
| $Li_2O$ | 20–30 |
| RO | 5–25 |
| $Nd_2O_3$ | 0.1–2 |
| $CeO_2$ | 0.1–0.3 |
| $Al_2O_3$ | 0–8 | wherein RO is defined as in claim 1.

7. A glass laser as defined in claim 5 in which the following ingredients are present in mole percent:

| Ingredient: | Percent |
|---|---|
| $SiO_2$ | 49–62 |
| $Li_2O$ | 25–30 |
| RO | 8–22 |
| $Nd_2O_3$ | 0.1–1 |
| $CeO_2$ | 0.1–0.2 |
| $Al_2O_3$ | 2–5 | wherein RO is defined as in claim 1.

8. A glass laser as defined in claim 1 in which a solarization inhibiting oxide is present.

9. A glass laser as defined in claim 8 in which the solarization inhibiting oxide is antimony oxide.

10. A glass laser as defined in claim 8 in which the solarization inhibiting oxide is titanium dioxide.

11. A glass laser as defined in claim 1 wherein the base glass has the following composition:

| Ingredient: | Mole percent |
|---|---|
| $SiO_2$ | 60 |
| $Al_2O_3$ | 2.5 |
| $Li_2O$ | 27.5 |
| MgO | 10 | and wherein the following are additionally present in the indicated mole percent amounts based on 100 mole percent of the base glass composition:

| | |
|---|---|
| $Nd_2O_3$ | 0.5 |
| $CeO_2$ | 0.16 |

12. A glass laser as defined in claim 1 wherein the base glass has the following composition:

| Ingredient: | Mole percent |
|---|---|
| $SiO_2$ | 50 |
| $Al_2O_3$ | 2.5 |
| $Li_2O$ | 27.5 |
| BaO | 20 | and wherein the following are additionally present in the indicated mole percent amounts based on 100 mole percent of the base glass composition:

| | |
|---|---|
| $Nd_2O_3$ | 0.5 |
| $CeO_2$ | 0.16 |

13. A glass laser as defined in claim 1 wherein the base glass has the following composition:

| Ingredient: | Mole percent |
|---|---|
| $SiO_2$ | 59.16 |
| $Al_2O_3$ | 3.34 |
| $Li_2O$ | 27.5 |
| BeO | 10 | and wherein the following are additionally present in the indicated mole percent amounts based on 100 mole percent of the base glass composition:

| | |
|---|---|
| $Nd_2O_3$ | 0.5 |
| $CeO_2$ | 0.16 |

14. A glass laser as defined in claim 1 wherein the base glass has the following composition:

| Ingredient: | Mole percent |
|---|---|
| $SiO_2$ | 60 |
| $Al_2O_3$ | 2.5 |
| $Li_2O$ | 27.5 |
| SrO | 10 | and wherein the following are additionally present in the indicated mole percent amounts based on 100 mole percent of the base glass composition:

| | |
|---|---|
| $Nd_2O_3$ | 0.5 |
| $CeO_2$ | 0.16 |

15. A glass laser as defined in claim 1 wherein the base glass has the following composition:

| Ingredient: | Mole percent |
|---|---|
| $SiO_2$ | 60 |
| $Al_2O_3$ | 2.5 |
| $Li_2O$ | 27.5 |
| BaO | 10 | and wherein the following are additionally present in the indicated mole percent amounts based on 100 mole percent of the base glass composition:

| | |
|---|---|
| $Nd_2O_3$ | 0.5 |
| $CeO_2$ | 0.16 |

16. A glass laser as defined in claim 1 which is in the form of a glass rod.

17. A glass laser as defined in claim 5 which is in the form of a glass rod.

18. A method of making a relatively low solarization, high efficiency glass laser component comprising the steps of (1) preparing a melt from a composition having the following ingredients in approximate mole percentages:

| Ingredient: | Percent |
|---|---|
| $SiO_2$ | 45 to 75 |
| $Li_2O$ | 15 to 35 |
| RO | ½ to 30 |
| $Nd_2O_3$ | ¹⁄₁₀ to 2 |
| $CeO_2$ | ¹⁄₁₀ to ½ |
| $Al_2O_3$ | 0 to 8 | wherein RO is selected from the group consisting of MgO, BeO, SrO, BaO, mixtures thereof, and mixtures thereof with CaO, where the total amount of $Li_2O$ and RO is not substantially higher than about 50 mole percent; when the $Li_2O$ is present at about 15 mole percent, the amount of RO is at least about 10 mole percent; and when the RO content is at least about ½ mole percent, the amount of $Li_2O$ is at least about 24 mole percent; and (2) forming a rod from the melt to obtain the relatively high efficiency glass laser component.

19. A method as set forth in claim 18 wherein the glass is annealed prior to formation of said rod.

20. A method as defined in claim 18 in which the melt has the following approximate composition:

| Ingredient: | Mole percent |
|---|---|
| $SiO_2$ | 60 |
| $Al_2O_3$ | 2.5 |
| $Li_2O$ | 27.5 |
| MgO | 10 |
| $Nd_2O_3$ | 0.5 |
| $CeO_2$ | 0.16 |

21. A method as defined in claim 18 in which the melt has the following approximate composition:

| Ingredient: | Mole percent |
|---|---|
| $SiO_2$ | 60 |
| $Al_2O_3$ | 2.5 |
| $Li_2O$ | 27.5 |
| SrO | 10 |
| $Nd_2O_3$ | 0.5 |
| $CeO_2$ | 0.16 |

References Cited

UNITED STATES PATENTS

| 2,171,145 | 8/1939 | Leverenz | 252—301.4 IV |
| 3,422,025 | 1/1969 | Snitzer et al. | 252—301.4 IV |
| 3,471,409 | 10/1969 | Lee, Jr., et al. | 252—301.4 IV |

ROBERT D. EDMONDS, Primary Examiner

U.S. Cl. X.R.

106—52; 330—4.3; 331—94.5